United States Patent [19]
Conley

[11] Patent Number: 5,435,561
[45] Date of Patent: Jul. 25, 1995

[54] ELECTRONIC PUTTING TRAINER

[76] Inventor: William P. Conley, 2780 Packard, Ypsilanti, Mich. 48197

[21] Appl. No.: 262,016

[22] Filed: Jun. 17, 1994

[51] Int. Cl.6 .............................................. A63B 69/36
[52] U.S. Cl. .................................................... 273/186.2
[58] Field of Search ............... 273/186.1, 186.2, 187.4, 273/187.5

[56] References Cited

U.S. PATENT DOCUMENTS

| | | | |
|---|---|---|---|
| 1,712,609 | 5/1929 | Gibson | 273/186.2 |
| 4,330,123 | 5/1982 | Kleinerman | 273/54 B |
| 4,535,986 | 8/1985 | Richards | 273/29 A |
| 4,898,389 | 2/1990 | Plutt | 273/186 A |
| 4,930,787 | 6/1990 | Nobles, Jr. | 273/186 A |
| 5,082,283 | 1/1992 | Conley et al. | 273/186.2 |
| 5,169,151 | 12/1992 | Conley | 273/186.2 |
| 5,332,225 | 7/1994 | Ura | 273/186.2 |

Primary Examiner—George J. Marlo
Attorney, Agent, or Firm—Gifford, Krass, Groh, Sprinkle, Patmore, Anderson & Citkowski

[57] ABSTRACT

A golf putting stroke trainer including an inertial sensor. The sensor is responsive to axial rotation and push-pull movement of the club face. The sensor is disposed in electrical communication with an alarm circuit. The trainer is positioned within a standard grip on the shaft of a putting club and provides a user-detectable signal if, during a putting stroke, the putter is rotated around the longitudinal axis of the shaft of the putter or moves in a direction parallel to the plane of the club face.

7 Claims, 1 Drawing Sheet

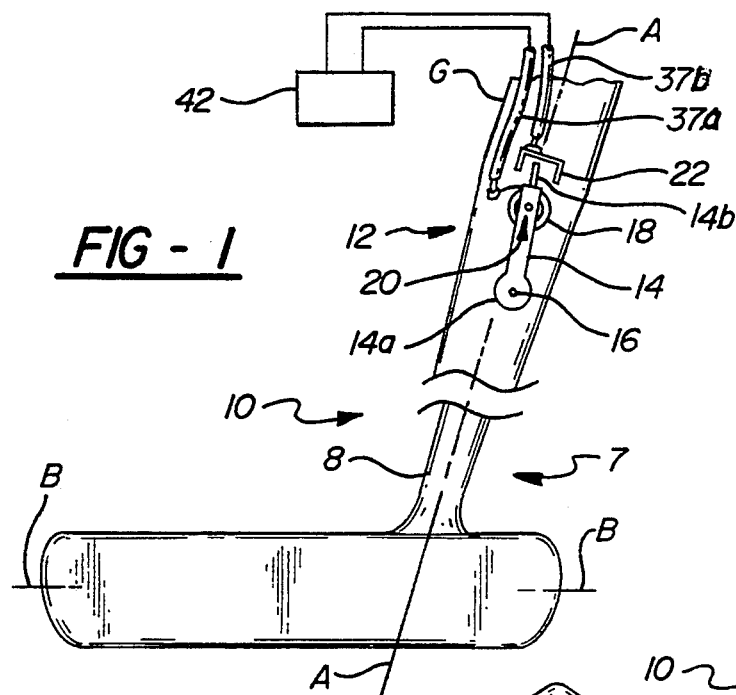
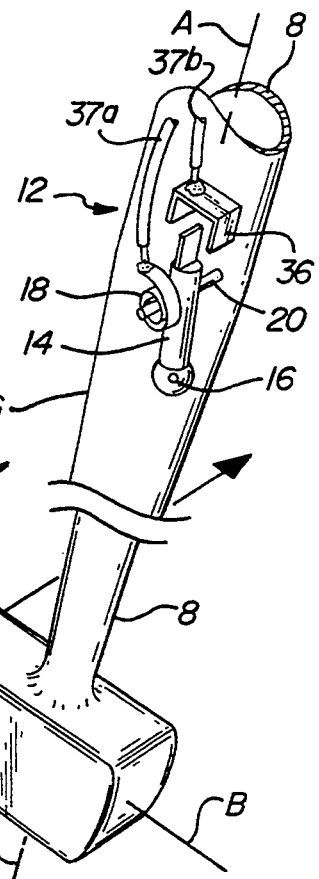
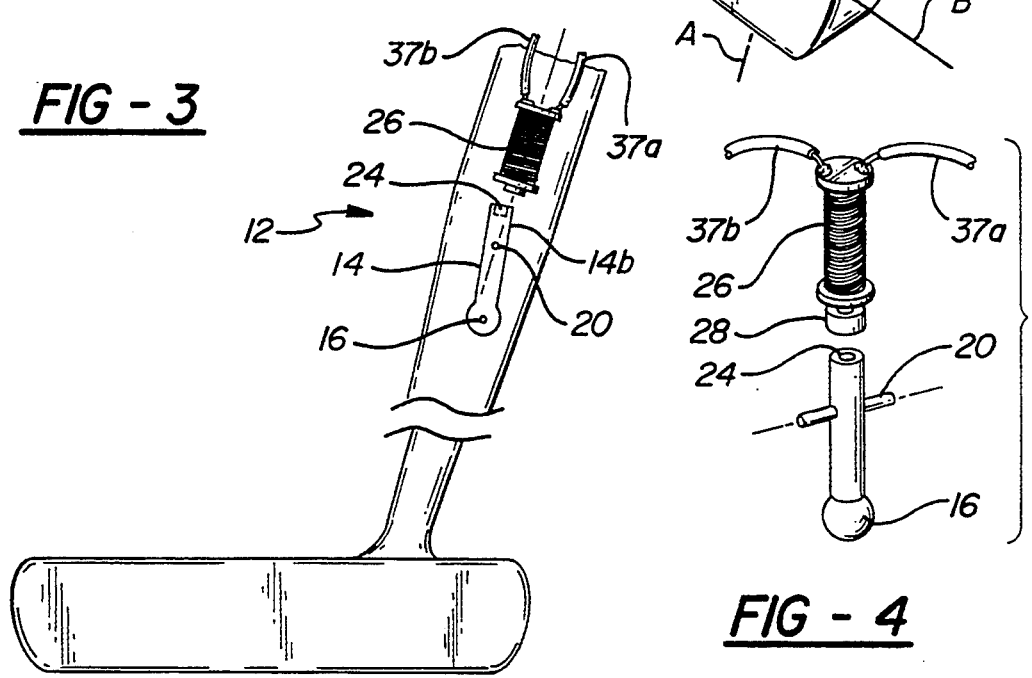

ELECTRONIC PUTTING TRAINER

FIELD OF THE INVENTION

This invention relates generally to training devices and more specifically to swing training devices. Most specifically, the present invention relates to an electromechanical device for instructing a golfer in a putting stroke.

BACKGROUND OF THE INVENTION

The game of golf, as well as various other physical activities, requires that a participant execute a precise set of physical maneuvers. Specifically, the game of golf requires that a player be capable of accurately swinging a club along a preferred path of travel within a proper range of velocity while simultaneously maintaining an appropriate orientation of the club. The putting stroke in particular is a very precise motion, demanding accurate neuromuscular programming. Acquisition of an effective putting stroke is typically achieved by long term repetition.

Many golfers employ the services of a professional trainer who observes and critiques their putting. Such services are expensive and are difficult to arrange at convenient times. Additionally, such critique generally provides a somewhat delayed feedback to the student. As a result of the foregoing, there has been a significant interest among golfers in the use of training devices for putting. It is highly desirable that a training device provide an accurate and substantially instantaneous feedback to the user as to the qualities of his or her putting stroke. It is further desirable that any such training device be usable in connection with fairly standard golfing equipment and that it be rugged, reliable and simple to use. Clearly, it is desirable that any training device for putting accurately evaluate all parameters of a proper stroke.

Heretofore, numerous devices have been developed to teach a proper putting stroke. Most of these devices include means to prevent the golfer's body from diverging from a proper swing plane. For example, it is known in the prior art to mount guide-like rails, or straps to the putter to constrain the motion of a golfer's body. Likewise, it is known to use electronic monitoring devices to determine whether or not a proper putting stroke has been achieved. However, these devices are awkward in appearance and, in the case of electronic monitoring devices which generally are not attached to the club, transport and set up can be difficult. Furthermore, in most cases, the prior art devices do not simulate the look and feel of actual putting.

A prior art device which attempts to overcome these difficulties is U.S. Pat. No. 4,930,787 of Nobles. This patent discloses a self-contained, easily-portable, electronic putting sensor which purports to teach proper putting habits under realistic conditions. The sensor assembly of the Nobles device includes two mercury switches mounted in the club head which are connected to a signalling device and which measure (1) the angle of the club face throughout the swing and (2) the tempo of the swing. However, unlike the present invention, the Nobles device cannot detect a proper ball strike on the "sweet spot" of the club face. In addition, the design of Nobles device requires the user to hold the club face level relative to the horizon; this creates difficulty for golfers of varying heights and putting styles. Finally, the sensitivity of the sensor in the Nobles device varies with the force of the putt. Thus, a training club utilizing the Nobles device is either insensitive to short putts or too sensitive to long putts.

My U.S. Pat. No. 5,169,151 discloses an electromechanical putting trainer which includes an inertial sensor responsive to axial rotation which is disposed in electrical communication with an alarm circuit. The sensor includes a pivoting arm which is disposed in a plane parallel to the ball striking face of the putter. A detector with two contacts is disposed proximate the free end of the pivoting arm so that, when the arm pivots in either direction, it will contact the detector. The device provides a user detectable signal if, during a putting stroke, the putter is rotated around the longitudinal axis of the shaft of the putter, thus causing the arm to swing and contact the detector.

Because the sensor described in U.S. Pat. No. 5,169,151 is disposed in a plane parallel to the club face, it is most easily disposed in the head of the club. While the patented device is sensitive to axial rotation when mounted thusly, it cannot easily be mounted in the grip or shaft of the club because of the orientation of the elongated arm of the sensor.

Thus, there is still a need for a putting trainer which accurately measures the attitude, tempo and position of the club independently of various swing speeds, as well as the accuracy of the ball stroke, without materially affecting the putting club's balance, feel or appearance. It is further desirable that such a device be mounted in the grip of the putter since it is much easier to install such a device rather than one mounted in the club head of the putter. Such a mounting contributes to the ruggedness, simplicity, and cost economy of the device. The present invention provides for an improved golf putting training device which is totally self contained and which is configured to fit inside the grip of a conventional putting club. The sensor of the present invention provides for immediate and accurate feedback through all portions of the putting stroke including ball strike accuracy. These and other advantages of the present invention will be readily apparent from the drawings, discussion and description which follow.

SUMMARY OF THE INVENTION

The present invention is a self-contained putting stroke training device which comprises an inertial sensor for detecting an improper putting stroke preferably mounted in the grip of the club. The device directly senses undesirable push-pull motion of the club face (movement in a direction parallel to the plane of the club face) and indirectly measures axial rotation of the putter. The sensor includes an elongated arm mounted on a pivot point which is oriented in a direction perpendicular both to the longitudinal axis of the shaft of the club, and also to the plane of the club face. Thus, the elongated arm is parallel to the shaft axis. The sensor generates an alarm control signal and thereby activates an alarm when a predetermined angle of axial club head rotation is exceeded or when the ball strike position on the putter face in inaccurate due to push-pull motion of the club. The alarm may be audible, tactile or visual; for example, it may be either a sound generator, a vibrator, or a light indicator.

In a particular embodiment of the device of the present invention, a magnetic type sensor is employed. A small permanent magnet is mounted in the end of the elongated arm of the sensor and faces a coil mounted in proximity thereto. The coil preferably has a steel or iron core which enhances sensitivity and provides a centering force for the arm through attraction to the permanent magnet.

BRIEF DESCRIPTION OF THE DRAWINGS

The following detailed description is best understood by reference to the following drawings in which:

FIG. 1 is a side, partially cut-away view of a putting trainer disposed in the grip of a standard putting club;

FIG. 2 is a rear perspective, cut-away view of the putting trainer of FIG. 1;

FIG. 3 is a side, partially cut-away view of another embodiment of the putting trainer of the present invention showing a magnetic sensor; and FIG. 4 is a perspective view of the magnetic sensor employed in the trainer of FIG. 4.

DETAILED DESCRIPTION OF THE PREFERRED EMBODIMENTS

Throughout the following detailed description, like numerals are used to refer to the same elements of the herein invention shown in multiple figures thereof. Referring now to the drawings and in particular to FIGS. 1 and 2, there is depicted a putting stroke trainer 10 for use with a golf putter, said trainer 10 comprising an inertial sensor 12 and an alarm 42 (pictured schematically). The inertial sensor 12 is disposed in the grip G of the putter 7 and is operative to provide an alarm control signal if axial rotation or push-pull of the putter occurs. As used herein, the term "axial rotation" shall refer to any rotation of the golf club 7 about an axis parallel to the shaft 8 of the club. The net effect of axial rotation is that different portions of the face of the club head 9 will be accelerated at different rates, causing a turning of the club face. The term "push-pull" shall refer to any movement of the club head 9 along or parallel to the axis B. In the event of axial rotation alarm 42 is activated which provides a detectable output whereby the golfer is notified of the improper movement of the putter during the stroke. Likewise, the alarm 42 is activated if the ball strike position is inaccurate due to push-pull movement. The alarm 42 may be either audio, visual or tactile in nature.

The inertial sensor 12 comprises an elongated arm 14 and a weight 16 supported on a pivot 20. Weight 16 serves only to concentrate mass at the end of arm 14. Thus, arm 14 can be shorter and yet swing through a greater arc inside the club shaft. This allows the rest angle of the club shaft to vary. Pivot 20 is rigidly attached via a pivot support (not depicted) to the inside of the grip G in a manner analogous to that depicted in U.S. Pat. No. 5,169,151 (the disclosure of which is hereby incorporated by reference) except that the elongated arm 14 of the sensor of the present invention is pivotally mounted such that the pivot 20 is essentially perpendicular to both the axis A of the putter shaft 8 and to the longitudinal axis B of the putter head 9.

Weight 16 is positioned on or near a first end 14a of the elongated arm 14 and, as explained above, concentrates mass. An adjustable spring element 18 is provided between the elongated arm 14 and the pivot support frame. Spring 18 provides a small centering force such that the elongated arm 14 returns to a given position when undisturbed. A second free end 14b of the elongated arm 14 is disposed proximate to a detector 22. As is best shown in FIG. 1, the elongated arm and weight 16 are capable of rotation about the pivot 20 in the plane of the page which corresponds to push-pull movement of the putter head as previously defined. Thus, an improper putting stroke producing push-pull movement of the putter head 9 Will cause the relative rotation of the elongated arm 14 about the pivot 20, causing it to contact the detector 22 which, in turn, activates the alarm 42.

Furthermore, the sensor 12 detects rotation about axis A indirectly. During a putting stroke, rotation is always accompanied by translation of the club. The club accelerates and decelerates during the back swing and forward stroke. During any acceleration or deceleration, the elongated arm 14 will be disturbed if the club face 9 is not perpendicular to the line of travel. The most common fault in putting is rotating the club face at the end of the back stroke. Since the club is decelerating at the end of the back stroke, the sensor 12 is well suited to detecting this particular fault.

FIGS. 1 and 2 depict a particular embodiment of the present invention which includes an inertial sensor 12 which has an electrical detector 36. A wire 37a establishes electrical communication with the arm 14 through the spring 18. A second wire 37b establishes electrical communication with the detector 36, which comprises a pair of electrical contacts mounted in proximity to the free end 14b of the elongated arm 14. The wires 37a and 37b are electrically in series with alarm 42 and a battery (not depicted). When the elongated arm 14, which is made of electrically conductive material, deflects and touches the detector 36, a circuit is completed and current can flow from the battery to activate alarm 42. In this manner, an indication is given when improper movement of the putter head 9 occurs.

The rotational inertia of the elongated arm 14/weight 16 assembly is such that any rotation or push-pull movement of the club head 9 causes the elongated arm 14 to touch the detector 36. The centering force generated by spring 18 is small compared to the inertial force. Sensitivity of the electrical detector 36/elongated arm 14 to club head rotation or translation can be changed by adjusting the distance between the free end 14b of the elongated arm 14 and the inner surface of the detector 36 when the inertial sensor 12 is at rest or undisturbed. That is, as the distance between the free end 14b of the elongated arm 14 and the detector 36 increases, the sensitivity of the inertial sensor 12 decreases.

The inertial sensor 14 previously described with reference to FIGS. 1 and 2, uses a detector 36 having electrical contacts to activate the alarm 42. It may be desirable to eliminate the contacts of detector 36 because of their sensitivity to dirt and corrosion over time. Accordingly, FIGS. 3 and 4 show an alternate embodiment of an inertial sensor 12 which employs a magnetic detector 24 instead.

As in the electrical detector 36, an elongated arm 14 with a weight 16 attached thereto is suspended from a pivot 20. However, the free end 14b of elongated arm 14 is provided with a small permanent magnet 24. The assembly comprising elongated arm 14, weight 16 and magnet 24 is free to rotate about the pivot 20. A coil 26 is mounted inside the golf club proximate the magnet 24. Preferably, it includes a magnetic core 28 formed of steel or iron. Core 28 has two functions, namely, it enhances the sensitivity of the sensor 12 and also provides a centering force for the arm 14 by means of attraction between the magnet 24 and the core 28. Thus, unlike the embodiment depicted in FIGS. 1 and 2, the sensor 12 of FIGS. 3 and 4 does not require a spring or other means to center it.

Any movement of the elongated arm 14 will induce a slight voltage in the coil 26 due to the electromagnetic effect. Wires 37a and 37b are connected to the coil 26 and carries the voltage signal. Thus, a movement of the elongated arm 14 due to rotation or push-pull movement of the club head 9 will create a voltage between wires 37a and 37b, which can be used to activate the alarm 42. Since the voltages are created by movement from an arbitrary rest position, there are no problems with adjustment over time.

Of course, other sensor/detector geometries may be employed to detect improper movement of the club. For example, the arm may be shortened or lengthened, or an optical detector such as that described in the '151 patent may be employed.

The present invention has been described with reference to certain embodiments and exemplifications thereof. Doubtless, one skilled in the art having access to the teachings of the present invention may be motivated to design alternate configurations of the present invention without departing from the scope thereof. The present invention is not intended to be limited to the exact embodiments and exemplifications depicted, but, rather, solely by the claims appended hereto and all reasonable equivalents thereof.

We claim:

1. A putting swing trainer comprising:
   a golf putter including an elongated shaft defining a first axis along the length thereof and a head mounted thereon having a ball striking surface defining a plane perpendicular to said first axis;
   an inertial sensor including a generally elongated arm having a length thereof disposed generally parallel to said first axis, said arm being supported on a pivot which is oriented in a direction perpendicular to said first axis and said plane so that improper movement of the putter including lateral movement of said putter along a second axis parallel to said plane or rotation about said first axis will cause relative rotation of the arm about the pivot;
   a detector associated with the sensor for indicating if said relative rotation of said arm about said pivot has occurred and for providing an alarm control signal in response thereto; and
   an alarm operative to receive the alarm control signal and to provide a detectable output in response so that the user is provided with an indication if improper movement of the putter occurs during the swing thereof.

2. The swing trainer of claim 1 wherein said detector is an electromagnetic detector.

3. The swing trainer of claim 2 wherein said arm includes a magnet disposed thereon and said detector further includes a coil disposed proximate said magnet whereby rotation of the arm and associated magnet relative to the coil causes a current to flow in the coil.

4. The swing trainer of claim 3 wherein said detector further includes a core of magnetic material disposed in said coil to provide a centering force for the arm.

5. The swing trainer of claim 2 wherein said arm includes a coil associated therewith and said detector further includes a magnet disposed proximate said coil whereby rotation of the arm and associated coil relative to the magnet causes a current to flow in the cell.

6. The swing trainer of claim 1 wherein the inertial sensor is disposed in the grip of the putter.

7. The swing trainer of claim 6 wherein said generally elongated arm has one end attached to a first portion of the grip and the other end attached to a spring, said spring being attached to a second portion of the grip, said sensor further including a rotatable weight supported at a point between the two ends of the arm, said weight having a conductive arm protruding therefrom in a cantilever fashion, the free end of the conductive arm being disposed between a pair of contacts, each of which is in electrical communication with the alarm, whereby axial rotation or movement along the second axis of the putter during a stroke causes the conductive arm to touch one of the contacts, thus activating the alarm and providing the user with an indication of an improper putting stroke.

* * * * *